United States Patent Office 2,798,527
Patented July 9, 1957

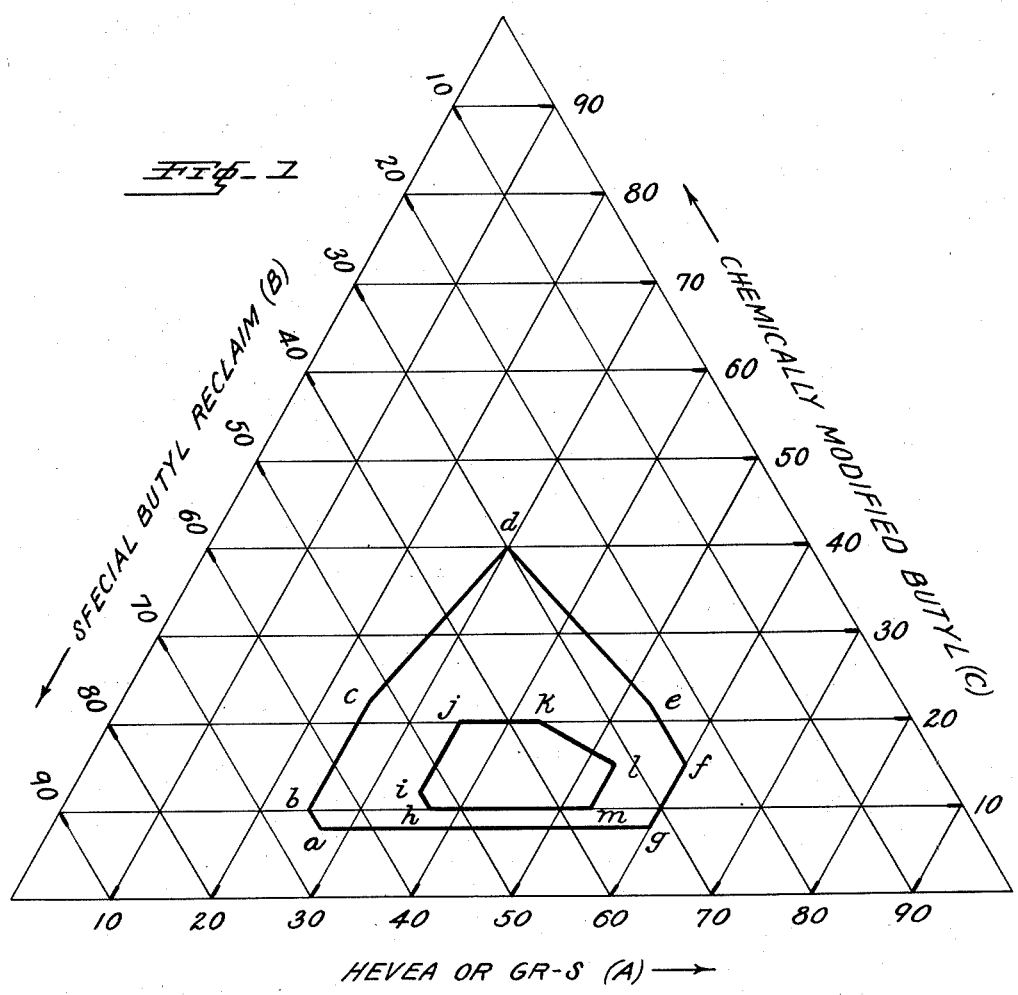
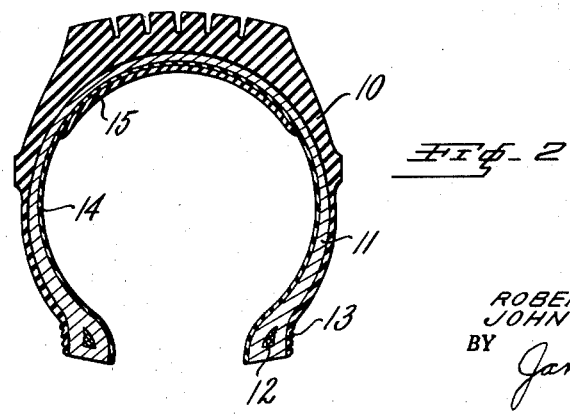

2,798,527
TUBELESS TIRE EMBODYING IMPROVED LINER

Robert W. Kindle, Detroit, and John J. Fleming, Grosse Pointe Woods, Mich., assignors to United States Rubber Company, New York, N. Y., a corporation of New Jersey Application December 23, 1954, Serial No. 477,302

2 Claims. (Cl. 152—330)

This invention relates to an improved pneumatic tire, and more particularly it relates to a pneumatic tire of the tubeless type embodying an air-retaining liner based on a novel mixture in specially selected proportions of (A) natural rubber and/or butadiene-styrene synthetic rubber (B) a particular kind of reclaimed Butyl rubber and (C) Butyl rubber that has been chemically modified by reaction with dinitrosobenzene.

Pneumatic tires of the tubeless type usually include a liner or inner essentially air-impermeable layer applied to the band ply of the tire casing, and serving to limit the rate of diffusion of air from within the tire cavity into the body or carcass of the tire. It has not proven to be an easy matter in practice to provide a liner composition possessing in combination the various qualities desired in the liner. The liner is not only required to be substantially air-impermeable, but it must be made of an economical, easily prepared composition that is processible and has good building tack, with ability to adhere well to the usual tire carcass stocks and ability to form secure splices. The liner must have good physical properties and it must not crack, separate, or otherwise deteriorate in manufacture or in use.

Although various improved liner compositions have been proposed in recent years, there has been a continuing desire for even greater improvement in certain respects.

Particular difficulty has been experienced in providing a tubeless tire liner composition that is not subject to separation or "blowing" between the liner and the carcass when the tire is removed from the type of tire vulcanizing mold that is designed to automatically shape the raw tire band into toroidal form as the mold is closed. It is a principal object of the invention to mitigate this particular difficulty.

Additional objects and advantages of the invention will be made manifest in the following detailed description, which is intended to be read with reference to the accompanying drawing, wherein:

Fig. 1 is a ternary diagram showing the proportions of the three essential ingredients of the liner composition of the invention; and, Fig. 2 is a transverse sectional view of a pneumatic tire embodying the liner of the invention.

The present invention is based on the unexpected discovery that tubeless tire liner compositions possessing heretofore unrealizable advantages can be provided by novel liner mixtures which are intimate blends of (A) natural rubber and/or butadiene-styrene synthetic rubber, (B) a particular kind of reclaimed Butyl rubber and (C) Butyl rubber that has been chemically modified by reaction with dinitrosobenzene.

The constituent (A) of the present liner composition, namely, Hevea rubber and/or GR-S, is so well known as to require no special description, it being understood that the GR-S is the standard butadiene:styrene emulsion copolymerizate, of the elastomeric kind containing typically less than 30% styrene.

The constituents (B) and (C) of the present liner are derived from the type of synthetic rubber known as Butyl rubber, which may be defined as a low-temperature copolymerizate of an isomonoolefin having from 4 to 6 carbon atoms with from 0.5 to 10% of a conjugated diolefin having from 4 to 8 carbon atoms. The common commercial type of Butyl rubber may be described as a copolymer of isobutylene with from 0.5 to 5% of isoprene. Butyl rubber has excellent air retention but it cannot be employed as such in a practical liner because it will not adhere well enough to the tire carcass, nor can it be blended as such with other materials that would give it the required building tack and adhesiveness, while retaining good physical properties, as far as the present inventors are aware.

The ingredient (B) of the liner is prepared by reclaiming vulcanized Butyl rubber in the presence of reclaiming oil, care being taken to limit the extent of the reclaiming operation in such manner that the reclaim contains less than a specified maximum of low molecular weight rubber hydrocarbon material, as determined by the standard chloroform extract test. The general methods of reclaiming vulcanized Butyl rubber with oil are well known, and require no detailed description here. It may be stated that Butyl rubber reclaim is commonly made by heating ground vulcanized Butyl rubber scrap with water or steam in the presence of say 3 or 4 parts of the reclaiming oil until it is softened and rendered sufficiently plastic to form a continuous sheet on a mill and to be processed like virgin rubber. Frequently several parts of clay are also included in the reclaiming mix. The Butyl rubber vulcanizate used in making reclaim contains substantial quantities of softener (usually non-volatile hydrocarbon oil, like the reclaiming oil) usually in amount of at least about 2% but not ordinarily more than about 30%, and is almost invariably derived from discarded or scrap inner tubes.

The Butyl rubber reclaim usually contains about 50 to 62% of rubber hydrocarbon and 25 to 35% of carbon black. It usually has a specific gravity of 1.1 to 1.2, an ash content of 5 to 12% and an acetone extract of 3 to 6%. An example of a typical reclaiming process is shown in U. S. Patent 2,545,828 of Randall.

For purposes of the present invention, the reclaiming process in the presence of oil is necessarily carried out past the stage of friability and incipient plasticity to the stage where the oil-bearing reclaim is definitely plastic and processible and forms a continuous sheet on the mill. However, it is at the same time absolutely essential for purposes of the invention not to carry out the reclaiming step (i. e., the heating with water or steam in the presence of reclaiming oil) under such severe conditions (e. g. at such elevated temperatures and/or for such prolonged periods of time) as have heretofore been employed commercially in making Butyl reclaim for ordinary purposes. The ordinary Butyl reclaims available commercially prior to the time of the present invention are not suitable for use in the present invention, since they do not provide the desired results in the present mixture.

Such previous conventional Butyl reclaim is distinguished from the Butyl reclaim necessary in the present invention by the high chloroform extract of such conventional reclaim. The prior form of Butyl reclaim was typically characterized by a chloroform extract of 30% and even more, by reason of the fact that the reclaiming conditions were severe enough to form substantial quantities of low molecular weight hydrocarbon, which is extracted by the chloroform. In contrast to this the reclaiming conditions employed in preparing the present Butyl reclaim are comparatively moderate or limited, so as to produce a Butyl reclaim in which the chloroform extract is less than about 22%, and even more preferably about 15%, although it will in any case not be less than 10%. Such chloroform extract values are far less than the values in usual commercial Butyl rubber reclaims available prior to the present invention, and these low values are taken to be indicative of the presence of a minimum of low molecular weight hydrocarbon.

The foregoing chloroform extract values were determined by the method described on pages 126 and 127 of "ASTM Standards on Rubber Products," December 1952 as Section 20 of "Chemical Analysis of Rubber Products (D 297–50T)," except that the extraction was carried out for 24 hours instead of 4 hours, to make certain that the removal of low molecular weight hydrocarbon was complete.

Another distinguishing characteristic of the Butyl rubber reclaim suitable for use in the present invention is the gel content, that is, the percentage of benzene-insoluble material, based on the weight of the hydrocarbon content of the Butyl reclaim. The benzene-insoluble gel may be determined by cutting the material to be tested into thin strips about 5 mms. long and less than 1 mm. in thickness, and placing about 0.3 gram of this in a Baker cell equipped with a 200 mesh stainless steel screen and containing about 75 cc. of pure benzene. The cell is stoppered and placed in the dark for 24 hours at 75° F. At the end of 24 hours, the solvent containing the dissolved material is drawn off and the residue is dried and weighed. This test is essentially as described at Ind. Eng. Chem. 39, 1339 (October 1947) and elsewhere in the literature. Whereas previous Butyl rubber reclaims have contained substantially less than 75% gel and were unsuitable for use in the invention, the Butyl rubber reclaim presently employed contains 78% gel or more, up to as much as 88% gel.

The chloroform extract and benzene-insoluble gel values afford a convenient criterion for determining the proper duration or severity of the reclaiming operation. Thus, the oil-bearing vulcanized Butyl rubber may be subjected to hot water or steam in the presence of the reclaiming oil as described above until a sample of the material has attained a chloroform extract value within the range of from 10 to 22%, and preferably 13 to 20%, and/or until the benzene-insoluble gel value is within the range of from 78% to 88%, and preferably about 82%. A single preliminary trial run, in which samples are withdrawn from time to time for determination of chloroform extract, will serve for all time as a guide to the proper extent of the reclaiming under the particular conditions existing in any given reclaiming plant. It might be mentioned for purposes of non-limiting illustration that reclaiming with about 3.6 parts of oil as described in the presence of 2 parts of water for about 3 hours at 150 pounds steam pressure or for about 1 hour at 200 pounds steam pressure consistently produced a Butyl reclaim having the required values, after milling to form a continuous sheet. This one hour treatment compares to some five hours or more of similar treatment at 200 pounds steam pressure under the same conditions to prepare an ordinary general purpose Butyl rubber reclaim.

Considering now ingredient (C) of the present liner composition, this material is prepared by subjecting initially raw, unvulcanized Butyl rubber to a limited chemical modification with dinitrosobenzene at elevated temperature. For this purpose the raw Butyl rubber is masticated at an elevated temperature in the presence of from 0.08 to 0.5 part of dinitrosobenzene, per 100 parts of the Butyl rubber. Preferably, the amount of dinitrosobenzene employed is from 0.1 to 0.2 part, per 100 parts of the Butyl rubber. Such mastication is preferably carried out in the presence of carbon black, and we preferably employ from about 25 to 75 parts of carbon black to 100 parts of Butyl rubber at this stage. Generally, we mix the carbon black thoroughly with the rubber before we add the dinitrosobenzene, for the purpose of effecting the required chemical modification. With the foregoing amounts of dinitrosobenzene, the desired chemical modification proceeds to the required critical extent when the mixture is masticated for a time ranging from 3 minutes at 400° F. to 60 minutes at 300° F., and preferably for 10 to 20 minutes at 350–375° F. It is a characteristic of this treatment that the chemical action of the dinitrosobenzene on the Butyl rubber is substantially exhausted. The thus-modified Butyl is in no sense a truly vulcanized material, and it is readily processible, and it is still definitely an unsaturated material susceptible of vulcanization or cure by the action of suitable added curatives.

After the modifying step, the chemically treated Butyl rubber is usually discharged on a mill and sheeted out. The modified Butyl rubber is non-friable, gives a smooth sheet on the mill, and can be handled in the same way as a Butyl-carbon black master batch of this type. No further processing or treatment of the thus-modified Butyl rubber constituting ingredient (C) is necessary.

The chemical pre-treatment of the Butyl rubber in preparing component (C) is accompanied by an increase in viscosity, and this phenomenon affords a convenient criterion of the sufficiency of the pre-treatment. In general, sufficient modifying re-agent is employed so that when the action of the dinitrosobenzene is exhausted the Linhorst plasticity value will have increased by 0.002 to 0.050 units (three minute reading in inches at 212° F. on a 0.075 gage sample) over the initial value for the unmodified Butyl rubber. When employed in the amounts and manner disclosed above, the dinitrosobenzene will provide automatically the specified increase in Linhorst plasticity number. The method of determining the Linhorst plasticity number is disclosed in detail in India Rubber World, August 1953, page 626.

The described chemical modification of the Butyl rubber with dinitrosobenzene is also accompanied by a definite increase in the gel content of the Butyl rubber. In the reaction product the benzene-insoluble gel content is found to lie between 10% and 80%.

Para-dinitrosobenzene is the preferred reagent for effecting the desired modification of the Butyl rubber, but meta-dinitrosobenzene may also be used.

The above-described Butyl reclaim rubber component (B) and the dinitrosobenzene-modified Butyl rubber component (C) are both compatible with the natural rubber or GR–S rubber constituting ingredient (A), and in this respect components (B) and (C) are unlike ordinary Butyl rubber. In making the liner composition of the invention all three ingredients are mixed together intimately in any suitable rubber mixing machinery, such as an internal mixer or a roll mill, and there are also included in the liner mixture conventional curatives in conventional amounts sufficient to vulcanize the whole batch. The Butyl reclaim and the dinitrosobenzene modified Butyl rubber reaction product are both vulcanizable materials, susceptible of being vulcanized by the usual vulcanizing ingredients under the usual vulcanizing conditions.

For purposes of the invention, the oil-bearing Butyl rubber reclaim having the specified chloroform extract, the dinitrosobenzene modified Butyl rubber, and the Hevea rubber or GR–S are mixed intimately in certain proportions that are best specified with the aid of a ternary diagram, as shown in Fig. 1 of the accompanying drawing. In Fig. 1 of the drawing the three-component liner mixtures of the invention are represented as falling within an irregular polygon bounded by straight lines drawn between the points a, b, c, d, e, f and g, the coordinates of which (in term of parts in 100 parts of the entire rubber hydrocarbon present; or in percentages of the whole rubber content) are as follows:

COORDINATES (PERCENT)

| Component | (A) Hevea or GR-S | (B) Special Butyl Reclaim Hydrocarbon | (C) Dinitrosobenzene Modified Butyl |
|---|---|---|---|
| Point: | | | |
| a | 27 | 65 | 8 |
| b | 25 | 65 | 10 |
| c | 25 | 53 | 22 |
| d | 30 | 30 | 40 |
| e | 53 | 25 | 22 |
| f | 60 | 25 | 15 |
| g | 60 | 32 | 8 |

In such mixtures, the Hevea rubber or GR-S rubber falls within the limits of from 25 to 75 parts, the special Butyl reclaim rubber falls within the limits of from 25 to 65 parts, and the dinitrosobenzene-modified Butyl rubber falls within the limits of from 8 to 40 parts, the values for each component in any specific mixture totaling 100 parts of rubber hydrocarbon.

Optimum results are obtained within a preferred range, contained within a smaller irregular polygon inclosed by the foregoing area, and having the coordinates h, i, j, k, l and m as follows:

COORDINATES (PERCENT)

| Component | (A) Hevea or GR-S | (B) Special Butyl Reclaim Hydrocarbon | (C) Dinitrosobenzene Modified Butyl |
|---|---|---|---|
| Point: | | | |
| h | 37 | 53 | 10 |
| i | 35 | 53 | 12 |
| j | 35 | 45 | 20 |
| k | 43 | 37 | 20 |
| l | 53 | 32 | 15 |
| m | 53 | 37 | 10 | in this preferred range, the Hevea rubber or GR-S rubber falls within the limits of from 35 to 53 parts, the special Butyl reclaim rubber falls within the limits of from 32 to 53 parts, while the dinitrosobenzene modified Butyl rubber falls within the limits of from 10 to 20 parts, the values for each component in any specific mixture totaling 100 parts.

Before mixing the Hevea rubber or GR-S rubber with the remaining two essential rubbery components, some 25 to 75 parts of carbon black is preferably mixed with 100 parts of the Hevea or GR-S. Although it is preferable that the component (A), the Hevea or GR-S rubber, be the same rubber as the rubber stock on which the tire carcass is based, satisfactory results are also obtainable if these rubbers are not the same. For example, Hevea rubber may be used in the liner when the carcass stock is based on GR-S, or GR-S may be used in the liner when the carcass stock is based on Hevea rubber. Also, the liner may of course be based on a mixture if any desired relative proportions of Hevea and GR-S as component (A). The carcass may also be composed of a mixture of rubbers.

The final liner stock is therefore composed of the three ingredients (A), (B) and (C), typically together with suitable proportions of carbon black, vulcanizing ingredients such as sulfur in amount sufficient to vulcanize the composition, accelerators of vulcanization, activators of acceleration, and any other desired compounding ingredients.

Usually the final mixture will contain from 20 to 60 parts of reinforcing carbon black per 100 parts of rubber hydrocarbon (i. e. rubber hydrocarbon supplied by the ingredients (A), (B) and (C)). The proportions of sulfur may vary somewhat, typically ranging from 1.0 to 2.5 parts per 100 parts of natural rubber or GR-S. Zinc oxide will frequently be present in amount from 3 to 10 parts per 100 parts of (A), while stearic acid will usually be present in amount from 1 to 4 parts per 100 parts of (A). Zinc laurate may also be used, suitably in amounts ranging from 1 to 6 parts. A small amount of softener is usually employed also.

The novel liner blend of the invention is then shaped into a continuous body having the desired form, which is usually the form essentially of a sheet, by any suitable method, such as calendering or tubing. The resulting liner sheet is then applied to the interior surface of the raw tire carcass in accordance with conventional procedure, and the assembly is thereafter vulcanized in a mold of the desired tire shape. The liner becomes firmly and permanently bonded to the tire carcass during the cure, and the liner also develops excellent physical properties, while being highly impermeable to air.

The following examples, in which all parts are expressed by weight, will serve to illustrate various aspects of the invention in more detail.

*Example 1*

Referring to Fig. 2 of the drawing, the invention was employed to make a tubeless tire including the usual outer rubber covering 10 constituting the tread and sidewall, beneath which there was disposed the usual carcass 11 composed of a plurality of plies of adhesive-treated cord fabric skim coated with conventional carcass stock based on natural rubber. The tire included the usual inextensible bead elements 12 in the ends of the carcass, and the outer portions of the bead area were provided with a suitable rim sealing arrangement 13. The liner composition 14 of the invention was applied to the interior surface or band ply surface of the carcass in the form of a complete envelope or sheet extending across the crown of the tire from one bead area to the other, in intimate adhesive contact with the carcass stock. If there is no covering of carcass stock on the interior band ply surface, then the liner 14 is in adhesive contact with the cords themselves, bearing the latex-resin adhesive material. The interior crown surface of the liner preferably has applied thereover a layer 15 of puncture-sealing material, that is capable of sealing any holes accidentally made in the tire by puncturing objects such as nails. The method of assembling the foregoing parts in their proper relation and vulcanizing the assembly in the desired shape in a mold is well understood by those skilled in this art, and requires no detailed description here.

An oil-bearing, sheet-forming Butyl rubber reclaim was then prepared by the procedure described above, by heating for 3 hours, under a steam pressure of 150 p. s. i., the following mixture:

Parts by weight
Ground Butyl rubber inner tubes (containing at least about 2% non-volatile hydrocarbon oil softener)__ 100
Reclaiming oil (same non-volatile oil as above softener) _____ 3.6
Clay _____ 3
Water _____ 2

The thus de-vulcanized material is passed through a sheeter mill, strained, put on a refiner mill, and finally put through a tight finishing mill. This oil bearing sheet-forming Butyl rubber reclaim had the following properties:

Specific gravity _____ 1.168
Ash, percent _____ 7.6
Acetone extract _____ 7.7
Chloroform extract _____ 13.1

Alkalinity _____ neutral
Carbon block, percent _____ 30.1
Total sulfur, percent _____ 1.02
Butyl rubber hydrocarbon, percent _____ [1] 55
Benzene-insoluble gel, percent _____ 82

[1] Estimated.

This material constituted component (B).

Component (C) was then made by first compounding the following modified Butyl master batch:

MODIFIED BUTYL MASTER BATCH

GR-I 25 _____ 100.00
HMF carbon black _____ 35.00
Polyac _____ 0.75
                                          _____
                                          135.75

The Polyac was a trade preparation believed to be composed of 25% para-dinitrosobenzene and 75% of inert material. Therefore, this composition included some 0.16 part of para-dinitrosobenzene per 100 parts of Butyl rubber. The GR-I 25 was a commercially available type of Butyl rubber (copolymer of isobutylene with isoprene), and it was first intimately mixed with the carbon black in a Banbury mixer, after which the para-dinitrosobenzene was added and the mixing was continued for 15 minutes at a temperature range of from 350° F. to 375° F. The batch was discharged on a mill and sheeted out to give a smooth sheet.

The following final compound was then prepared:

FINAL COMPOUND

| | Parts |
|---|---|
| (B) Special Butyl rubber reclaim | 136.00 |
| (C) Chemically modified Butyl rubber masterbatch | 33.94 |
| (A) No. 1 smoked sheet [1] | 100.00 |
| SRF carbon black [1] | 35.00 |
| Light process oil [1] | 10.00 |
| Stearic acid [1] | 2.50 |
| Zinc oxide [1] | 7.50 |
| Mercaptobenzothiazole disulfide | 1.00 |
| Monex (tetramethyl thiuram monosulfide) | 0.25 |
| Sulfur | 2.00 |
| | 328.19 |

[1] Master batched.

The amount of special Butyl rubber reclaim used corresponded to 75 parts of Butyl rubber hydrocarbon, while the amount of chemically modified Butyl rubber used corresponded to 25 parts of Butyl rubber hydrocarbon.

Samples of the foregoing liner compound after curing in a press for 30 minutes at 45 pounds of steam had the following physical properties:

Tensile _____ p. s. i__ 1040
Elongation _____ percent__ 613
300% modulus _____ p. s. i__ 300

These physical properties not only represent an excellent state of quality not heretofore attainable in a practical tubeless tire liner composition insofar as the present inventors are aware, but the liner composition when applied to a raw tire carcass as described displayed unusually strong adhesion after cure of the assembly, and achieved long life and was free from cracking and separation in extensive laboratory wheel tests and road tests.

One most striking advantage of this liner composition is that it is not subject during or following cure to a particular kind of difficulty encountered in previous tubeless tire liners based on mixtures of (A) and (C) alone, or (A) and (B) alone. In such mixtures difficulties are encountered when it is attempted to manufacture tubeless tires in the type of tire vulcanizing mold that automatically changes the shape of the raw tire from a flat band (in which shape it is initially assembled on the tire building drum) to toroidal shape. Such automatic shaping presses or molds are typified by those known as the Bag-O-Matic presses. It is a special characteristic of tire manufacturing operations involving such automatic shaping and molding presses that the cured tire is removed from the mold at a significantly higher temperature than in other types of tire mold such as the so-called pot heater type of vulcanizer or the conventional so-called unit vulcanizer. In the automatic shaping and molding press there is a tendency for the tubeless tire liner to develop blisters or "blows" due to separation of the liner from the tire carcass after removal from the mold at unusually high temperature. The present ternary liner composition has been demonstrated in practice to be free from this defect.

The ternary liner composition of this example is unique in comparison to liners based on mixtures of (A) and (B) or (A) and (C). In other words, both ingredients (B) and (C) are necessary in combination in order to produce the desired improvement, and neither (B) nor (C) alone is capable of furnishing the desired results when mixed with (A). Without the particular Butyl rubber reclaim characterized by the required chloroform extract value, satisfactory results are not obtained.

*Example II*

This example illustrates the unsatisfactory results obtained if ordinary Butyl rubber reclaim having a high chloroform extract is substituted for the Butyl reclaim of low chloroform extract described in Example I. The procedure of Example I is repeated, using instead conventional reclaimed Butyl rubbers having the following characteristics:

| | Reclaim 1 | Reclaim 2 | Reclaim 3 |
|---|---|---|---|
| Specific Gravity | 1.163 | 1.156 | 1.161 |
| Ash, Percent | 6.9 | 6.5 | 7.9 |
| Acetone Extract, Percent | 5.5 | 7.2 | 7.4 |
| Chloroform Extract, Percent | 32.6 | 38 | 36.8 |
| Alkalinity | neutral | neutral | neutral |
| Carbon black, Percent | 30.2 | 29.8 | 29.3 |
| Total Sulfur, Percent | 1.03 | 1.02 | .95 |

The Butyl rubber reclaims 1, 2 and 3 are typical of the ordinary reclaims commercially available prior to the present invention, and it will be noted that they are all characterized by a high chloroform extract value, in contrast to the reclaim used in Example I, which had a chloroform extract of 13.1%. Ternary liner mixtures were prepared from reclaims 1, 2 and 3 after the manner of Example I, and after vulcanization as described the typical physical properties were as follows:

| | 1 | 2 | 3 |
|---|---|---|---|
| Tensile _____ p. s. i__ | 880 | 780 | 800 |
| Elongation _____ percent__ | 663 | 620 | 623 |
| 300% Modulus _____ p. s. i__ | 200 | 200 | 200 |

It will be apparent from these data that the reclaims 1, 2 and 3 produced a ternary liner mixture of inferior physical properties, in comparison to the ternary mixture of Example I. Extensive experimental data and laboratory and road test experience along these lines have led to the unobvious conclusion that in the ternary liner blend satisfactory results are unexpectedly obtainable only if the chloroform extract of the reclaim is within the range previously set forth, instead of above such ranges as has ordinarily been the case in commercial Butyl rubber reclaims.

*Example III*

Further examples of specially prepared reclaims which give satisfactory results in the invention because of their low chloroform extract are as follows:

|  | Reclaim 3 | Reclaim 4 |
|---|---|---|
| Specific gravity | 1.173 | 1.179 |
| Ash, percent | 6.3 | 6.1 |
| Acetone extract, percent | 6.3 | 4.4 |
| Choroform extract, percent | 19.7 | 17.6 |
| Alkalinity | neutral | neutral |
| Carbon black, percent | 29.7 | 31.4 |
| Total sulfur, percent | 1.13 | 1.14 |

These sheet-forming, oil-bearing materials were prepared as described above, the time and temperature of the reclaiming in the presence of oil being carefully limited so that the required low chloroform extract was obtained. The behavior and properties of the three-component mixtures based on these reclaims was in marked contrast to the unsatisfactory results obtained with mixtures based on high chloroform extract conventional reclaims.

It is also desired to point out that the oil-bearing, non-friable, sheet-forming, plastic and processible Butyl rubber reclaim having the specified chloroform extract value is unlike certain prior art vulcanized Butyl rubber compositions partially refined in the absence of softeners to a friable, non-plastic, non-sheet-forming, crumb-like state. The latter kind of material is disclosed in the Sarbach Patent 2,676,636 as a component of a tubeless tire liner, but such material is not an equivalent of the special Butyl rubber reclaim employed in the present invention. Such prior material is typified by a chloroform extract value of only 2.92% (in contrast to the 10-22% presently required) and by a benzene-insoluble gel content of 96.48-96.85% (in contrast to the 78-88% gel of the present Butyl reclaim). The prior material does not provide the advantages of the special Butyl rubber reclaim if substituted therefor in the present ternary liner blend, since the processing and physical qualities are unsatisfactory.

Having thus described our invention, what we claim and desire to protect by Letters Patent is:

1. A pneumatic tire of the tubeless type having on the interior surface of the carcass an air-retaining liner extending across the crown of the tire from one bead area of the tire to the other, said liner being vulcanized to the inside of the carcass, said liner being made of a vulcanizate of a mixture comprising (A) an elastomer selected from the group consisting of Hevea rubber, butadiene:styrene copolymer synthetic rubber, and mixtures thereof, (B) a reclaim rubber made by heating a vulcanized rubbery copolymer of an isomonoolefin having from 4 to 6 carbon atoms with from 0.5 to 10% of a conjugated diolefin having from 4 to 8 carbon atoms in the presence of a reclaiming oil until said copolymer is sufficiently plastic to enable it to be sheeted out and re-used like virgin rubber in making vulcanized rubber articles, the said reclaim having a chloroform extract value of from 10 to 22%, and (C) a reaction product of 100 parts of said rubbery copolymer in an initially raw state with from 0.08 to 0.5 part of dinitrosobenzene, the proportions of (A), (B) and (C) being such that the mixture falls within the limits of an irregular polygon formed on a ternary composition diagram by joining with straight lines points having the following coordinates:

| Component | Coordinates | | |
|---|---|---|---|
|  | (A) | (B) | (C) |
| Point: | | | |
| a | 27 | 65 | 8 |
| b | 25 | 65 | 10 |
| c | 25 | 53 | 22 |
| d | 30 | 30 | 40 |
| e | 53 | 25 | 22 |
| f | 60 | 25 | 15 |
| g | 60 | 32 | 8 | the said coordinates being expressed in terms of parts by weight of rubbery hydrocarbon per 100 parts of total rubbery hydrocarbon in said ingredients.

2. A pneumatic tire of the tubeless type having on the interior surface of the carcass an air-retaining liner extending across the crown of the tire from one bead area of the tire to the other, said liner being vulcanized to the inside of the carcass, said liner being made of a vulcanizate of a mixture comprising (A) Hevea rubber, (B) a reclaim rubber made by heating a vulcanized rubbery copolymer of isobutylene with from 0.5 to 5% of isoprene in the presence of a reclaiming oil until said copolymer is sufficiently plastic to enable it to be sheeted out and re-used like virgin rubber in making vulcanized rubber articles, the said reclaim having a chloroform extract value of from 10 to 22%, and (C) a reaction product of 100 parts of said rubbery copolymer in an initially raw state with from 0.1 to 0.2 part of para-dinitrosobenzene, the proportions of (A), (B) and (C) being such that the mixture falls within the limits of an irregular polygon formed on a ternary composition diagram by joining with straight lines points having the following coordinates:

| Component | Coordinates | | |
|---|---|---|---|
|  | (A) | (B) | (C) |
| Point: | | | |
| h | 37 | 53 | 10 |
| i | 35 | 53 | 12 |
| j | 35 | 45 | 20 |
| k | 43 | 37 | 20 |
| l | 53 | 32 | 15 |
| m | 53 | 37 | 10 | the said coordinates being expressed in terms of parts by weight of rubbery hydrocarbon per 100 parts of total rubbery hydrocarbon in said ingredients.

References Cited in the file of this patent

UNITED STATES PATENTS

| 2,526,504 | Rehner | Oct. 17, 1950 |
| 2,587,470 | Herzegh | Feb. 26, 1952 |
| 2,698,042 | Perkins | Dec. 28, 1954 |

FOREIGN PATENTS

| 1,060,444 | France | Nov. 18, 1954 |
| 1,080,120 | France | May 26, 1954 |